(12) United States Patent
Miller

(10) Patent No.: US 6,322,475 B2
(45) Date of Patent: Nov. 27, 2001

(54) CONTINUOUSLY VARIABLE TRANSMISSION

(75) Inventor: Donald C. Miller, 2018 Winterwarm Rd., Fallbrook, CA (US) 92028

(73) Assignee: Donald C. Miller, San Diego, CA (US)

( * ) Notice: Subject to any disclaimer, the term of this patent is extended or adjusted under 35 U.S.C. 154(b) by 0 days.

(21) Appl. No.: 09/823,620

(22) Filed: Mar. 30, 2001

Related U.S. Application Data

(63) Continuation of application No. 09/133,284, filed on Aug. 12, 1998, now Pat. No. 6,241,636
(60) Provisional application No. 60/062,860, filed on Oct. 16, 1997, provisional application No. 60/056,045, filed on Sep. 2, 1997, provisional application No. 60/062,620, filed on Oct. 22, 1997, and provisional application No. 60/070,044, filed on Dec. 30, 1997.

(51) Int. Cl.[7] .............................. F16H 15/00; F16H 15/28
(52) U.S. Cl. ................... 476/5; 476/38; 280/236
(58) Field of Search .................... 476/5, 36, 38, 476/62; 74/64; 280/236, 238; 475/186, 189

(56) References Cited

U.S. PATENT DOCUMENTS

| 592,320 | 10/1897 | Kellogg . | |
|---|---|---|---|
| 1,175,677 | * 3/1916 | Barnes | ...................................... 476/5 |
| 1,376,057 | 4/1921 | Warner . | |
| 1,858,696 | * 5/1932 | Weiss | ...................................... 74/64 |
| 2,469,653 | * 5/1949 | Kopp | ......................................... 476/5 |
| 2,675,713 | 4/1954 | Acker . | |
| 2,931,234 | 4/1960 | Hayward . | |
| 2,931,235 | 4/1960 | Hayward . | |
| 3,248,960 | 5/1966 | Schottler . | |
| 3,707,888 | 1/1973 | Schottler . | |
| 3,996,807 | * 12/1976 | Adams | ...................................... 476/5 |
| 4,391,156 | * 7/1983 | Tibbals, Jr. | .............................. 476/5 |
| 4,735,430 | 4/1988 | Tomkinson . | |
| 4,756,211 | 7/1988 | Fellows . | |
| 4,856,374 | 8/1989 | Kreuzer . | |
| 4,900,046 | 2/1990 | Aranceta-Angoitia . | |
| 4,909,101 | 3/1990 | Terry . | |
| 5,020,384 | 6/1991 | Kraus . | |
| 5,236,403 | * 8/1993 | Schievelbusch | ....................... 476/38 |
| 5,318,486 | 6/1994 | Lutz . | |

FOREIGN PATENT DOCUMENTS

| 2310880 | 9/1974 | (DE) . |
|---|---|---|
| 2136243 | 1/1975 | (DE) . |
| 3940919A1 | 6/1991 | (DE) . |
| 0432742A1 | 12/1990 | (EP) . |
| 2035482 | 6/1980 | (GB) . |
| 2080452 | 2/1982 | (GB) . |
| 55-135259 | 4/1979 | (JP) . |
| WO99/20918 | 4/1999 | (WO) . |

\* cited by examiner

Primary Examiner—Thomas R. Hannon
Assistant Examiner—William C Joyce
(74) Attorney, Agent, or Firm—Knobbe Martens Olson & Bear LLP

(57) ABSTRACT

A continuously variable transmission. The transmission includes a plurality of power adjusters, such as spherical balls, frictionally interposed between a driving and a driven member. The driving and the driven member are each rotatably disposed over a main shaft. The spherical balls are configured to rotate about a modifiable axis and thereby provide a continuously variable shifting capability by adjusting the ratio between the angular velocity of the driving member in relation to the driven member. The system includes automatic and manual shifting gearing for adjusting the speed of the transmission. The system also includes a support a support member which is rotatably disposed over the main shaft and frictionally engaged to each of the spherical balls.

13 Claims, 10 Drawing Sheets

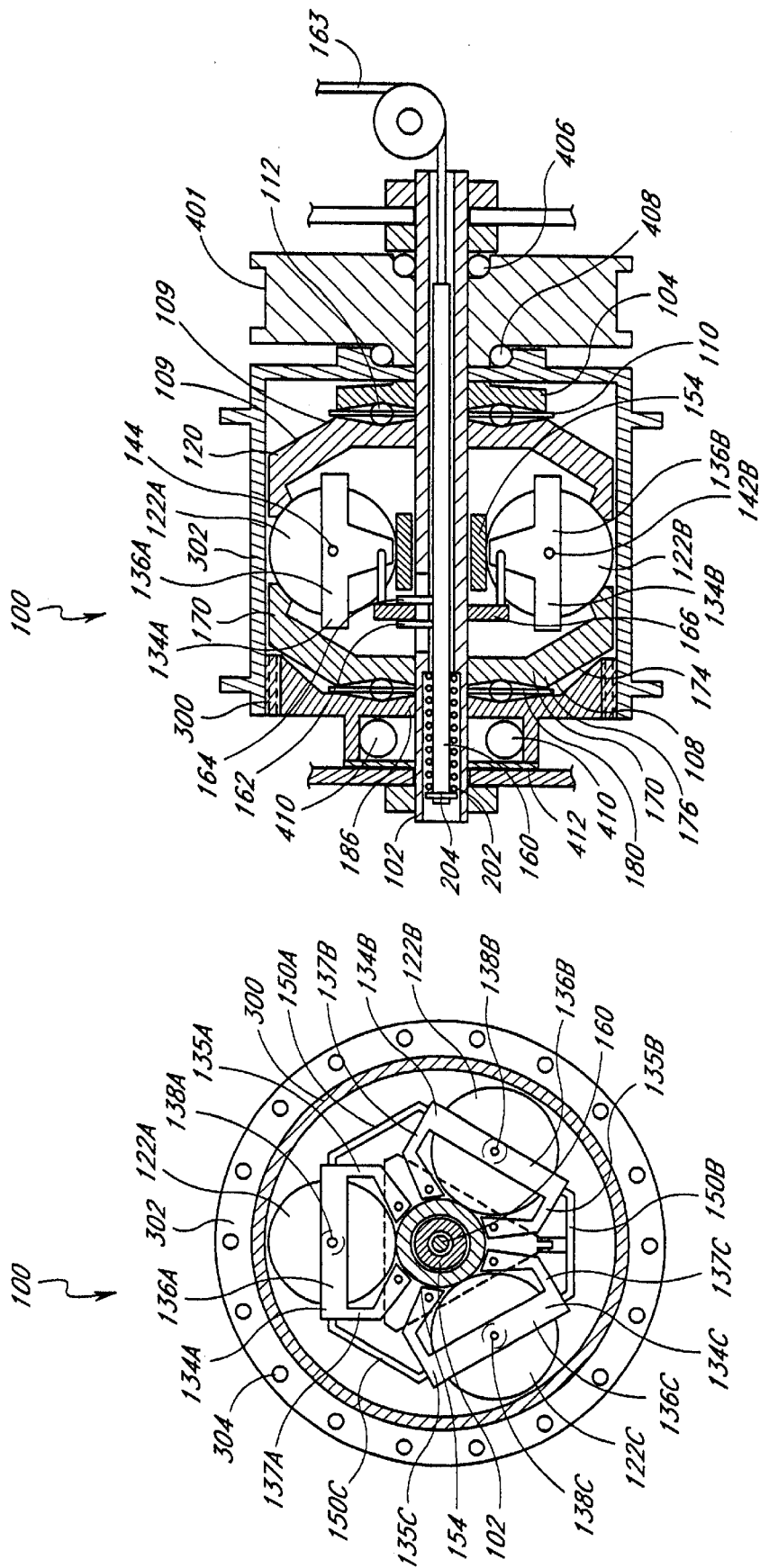

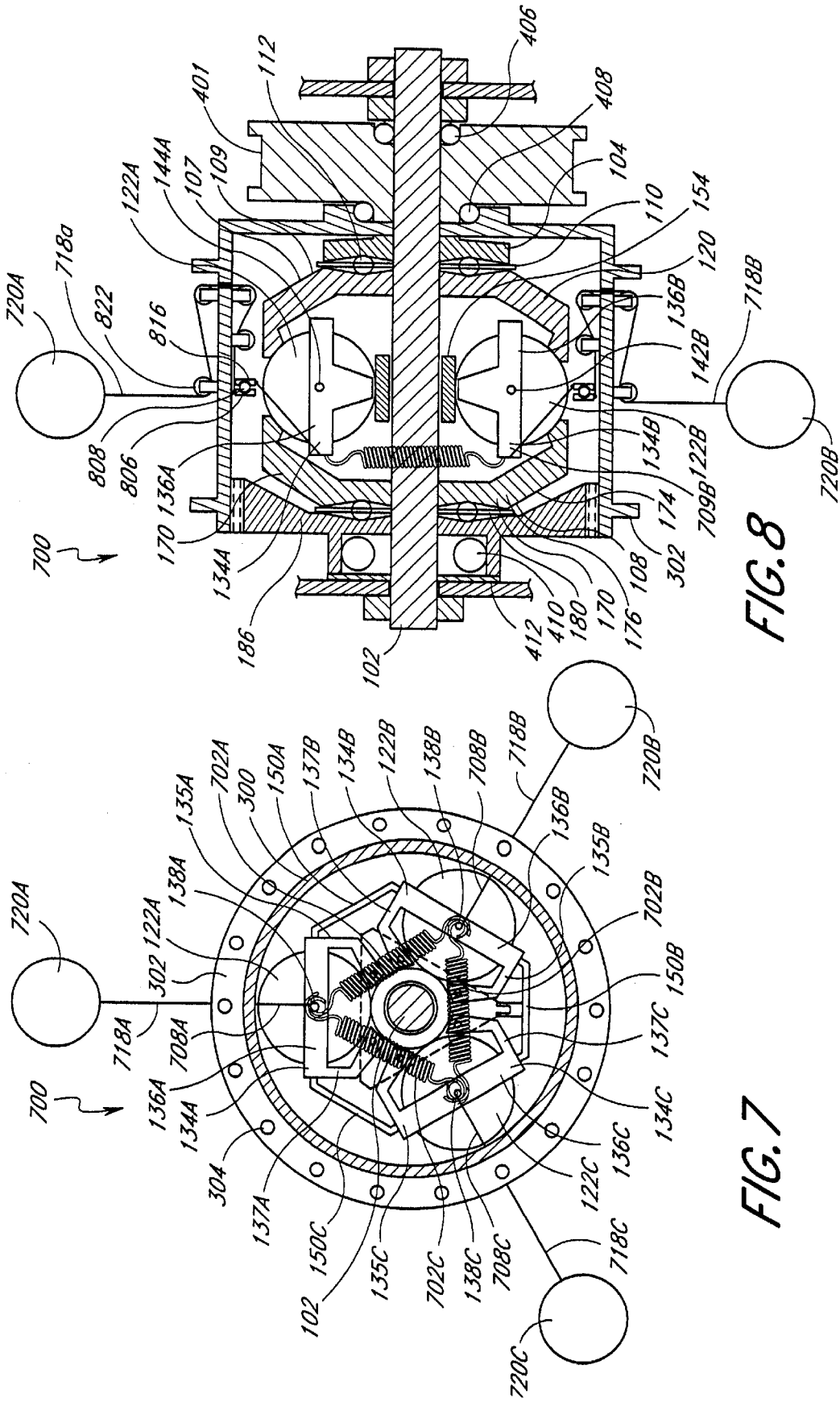

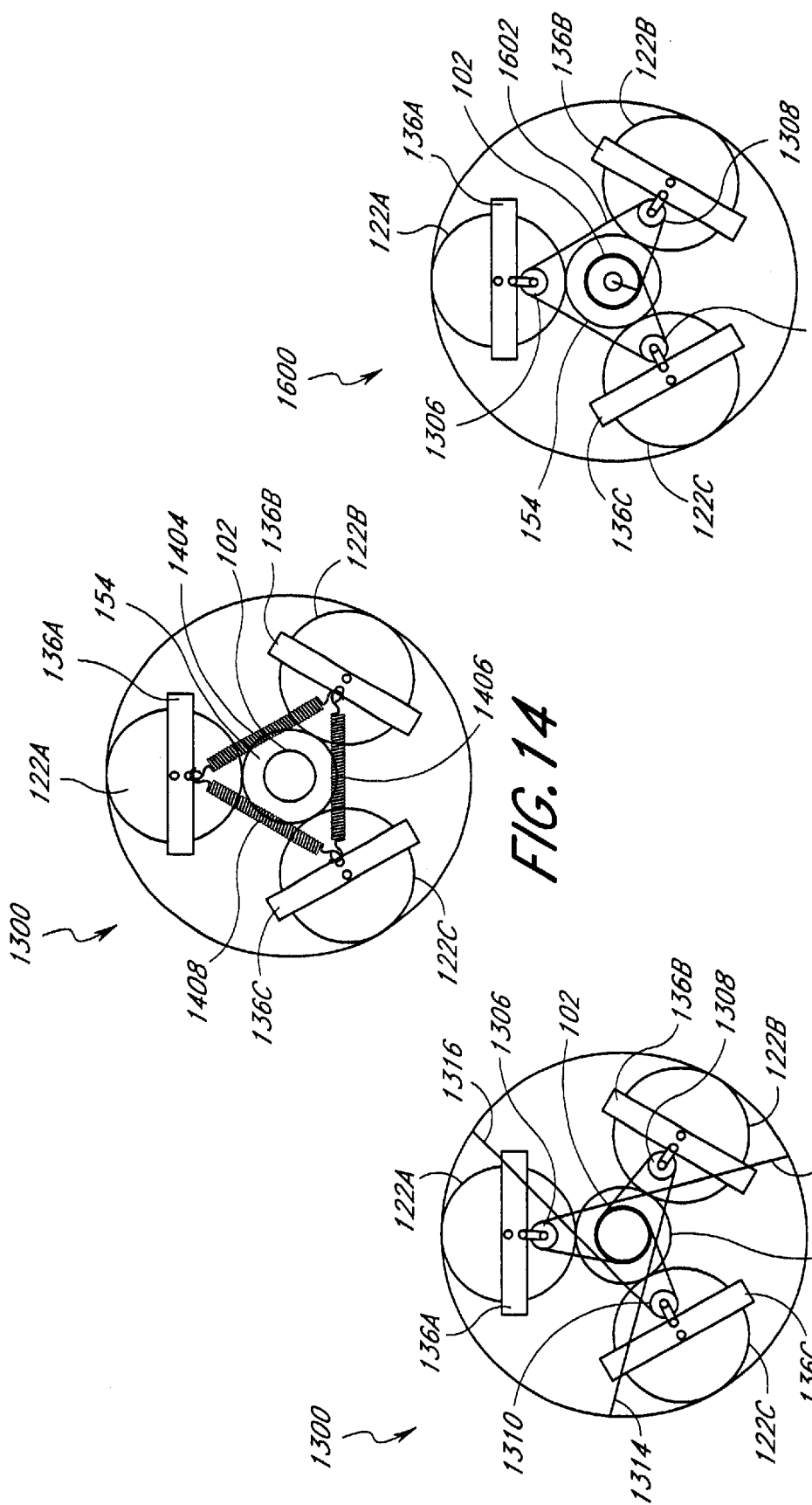

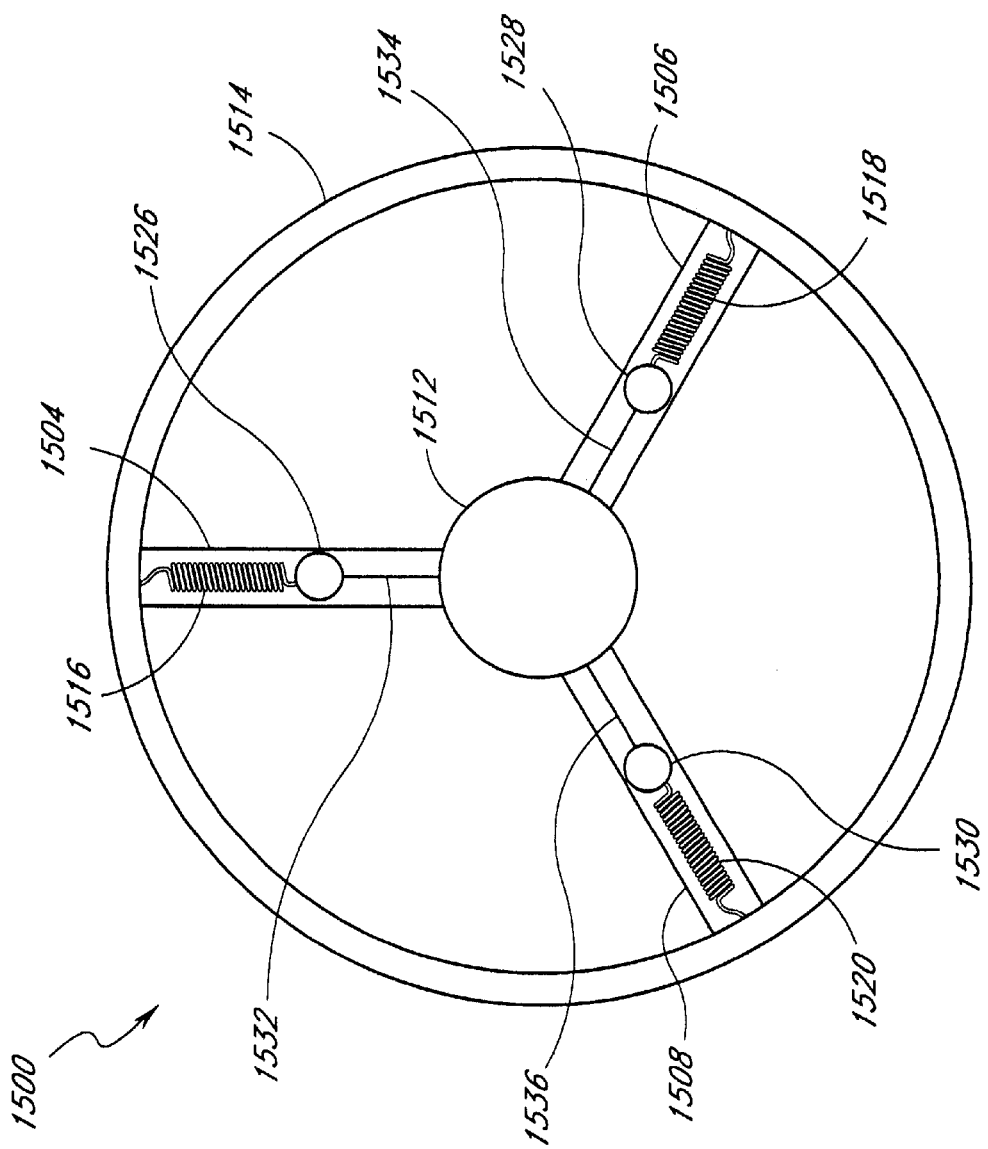

CONTINUOUSLY VARIABLE TRANSMISSION

RELATED APPLICATIONS

This application is a continuation of U.S. application Ser. No. 09/133,284, filed Aug. 12, 1998, now U.S. Pat. No. 6,241,636, which in turn claims priority to U.S. Provisional Application No. 60/062,860, filed on Oct. 16, 1997; U.S. Provisional Application No. 60/056,045, filed on Sep. 2, 1997; U.S. Provisional Application No. 60/062,620, filed on Oct. 22, 1997 and U.S. Provisional Application No. 60/070,044 filed on Dec. 30, 1997, all of which are incorporated herein by reference.

BACKGROUND OF THE INVENTION

1. Field of the Invention

The field of the invention relates to transmissions. More particularly the invention relates to continuously variable transmissions.

2. Description of the Related Art

In order to provide an infinitely variable transmission, various traction roller transmissions in which power is transmitted through traction rollers supported in a housing between torque input and output disks have been developed. In such transmissions, the traction rollers are mounted on support structures which, when pivoted, cause the engagement of traction rollers with the torque disks in circles of varying diameters depending on the desired transmission ratio.

However, the success of these traditional solutions have been limited. For example, in U.S. Pat. No. 5,236,403 to Schievelbusch, a driving hub for a vehicle with a variable adjustable transmission ratio is disclosed. Schievelbusch teaches the use of two iris plates, one on each side of the traction rollers, to tilt the axis of rotation of each of the rollers. However, the use of iris plates can be very complicated due to the large number of parts which are required to adjust the iris plates during shifting the transmission. Another difficulty with this transmission is that it has a guide ring which is configured to be predominantly stationary in relation to each of the rollers. Since the guide ring is stationary, shifting the axis of rotation of each of the traction rollers is difficult. Yet another limitation of this design is that it requires the use of two half axles, one on each side of the rollers, to provide a gap in the middle of the two half axles. The gap is necessary because the rollers are shifted with rotating motion instead of sliding linear motion. The use of two axles is not desirable and requires a complex fastening system to prevent the axles from bending when the transmission is accidentally bumped, is as often the case when a transmission is employed in a vehicle. Yet another limitation of this design is that it does not provide for an automatic transmission.

Therefore, there is a need for a continuously variable transmission with a simpler shifting method, a single axle, and a support ring having a substantially uniform outer surface. Additionally, there is a need for an automatic traction roller transmission which is configured to shift automatically. Further, the practical commercialization of traction roller transmissions requires improvements in the reliability, ease of shifting, function and simplicity of the transmission.

SUMMARY OF THE INVENTION

The present invention includes a transmission for use in rotationally or linearly powered machines and vehicles. For example the present transmission may be used in vehicles such as automobiles, motorcycles, and bicycles. The transmission may, for example, be driven by a power transfer mechanism such as a sprocket, gear, pulley or lever, optionally driving a one way clutch attached at one end of the main shaft.

One version of the invention includes a transmission comprising a shaft, a rotatable driving member rotatably mounted on the shaft, a rotatable driven member rotatably mounted on the shaft, a plurality of power adjusters frictionally interposed between the rotatable driving member and the rotatable driven member and adapted to transmit power from the driving member to the driven member, and a rotatable support member located concentrically over the shaft and between the shaft and the power adjusters, and frictionally engaged to the plurality of power adjusters, so that the power adjusters each make three point frictional contact against the driving member, the driven member, and the power adjusters.

Yet another version of the invention includes a shaft, a rotatable driving member rotatably mounted on the shaft, a rotatable driven member rotatably mounted on the shaft, a plurality of power adjusters frictionally interposed between the rotatable driving member and the rotatable driven member and adapted to transmit power from the driving member to the driven member, a rotatable support member located concentrically over the shaft and between the shaft and the power adjusters, and frictionally engaged to the plurality of power adjusters, so that the power adjusters each make three point frictional contact against the driving member, the driven member, and the power adjuster, and at least one outwardly extendible weight coupled to the plurality of power adjusters and rotatably affixed to the shaft, the at least one weight adapted to actuate a change in an axis of rotation of the plurality of power adjusters.

BRIEF DESCRIPTION OF THE DRAWINGS

FIG. 3 is an end cutaway elevational view of the transmission of FIG. 1.

FIG. 4 is a cutaway side elevational view of the transmission of FIG. 1.

FIG. 7 is an end cutaway view of an alternative embodiment of the transmission of the invention wherein the transmission shifts automatically.

FIG. 8 is a side elevational view of the transmission of FIG. 7.

FIG. 13 is a schematic cutaway end elevational view of another alternative embodiment of the transmission of the invention.

FIG. 14 is a schematic cutaway front elevational view of the transmission of FIG. 13.

FIG. 15 is a schematic end view of a housing for the transmission of FIGS. 13 and 14.

FIG. 16 is a schematic cutaway front elevational view of another alternative embodiment of the transmission of the invention.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

The present invention includes a continuously variable transmission that may be employed in connection with any type of machine that is in need of a transmission. For example, the transmission may be used in (i) a motorized vehicle such as an automobile, motorcycle, or watercraft, (ii) a non-motorized vehicle such as a bicycle, tricycle, scooter, exercise equipment or (iii) industrial power equipment, such as a drill press.

Figure 1:
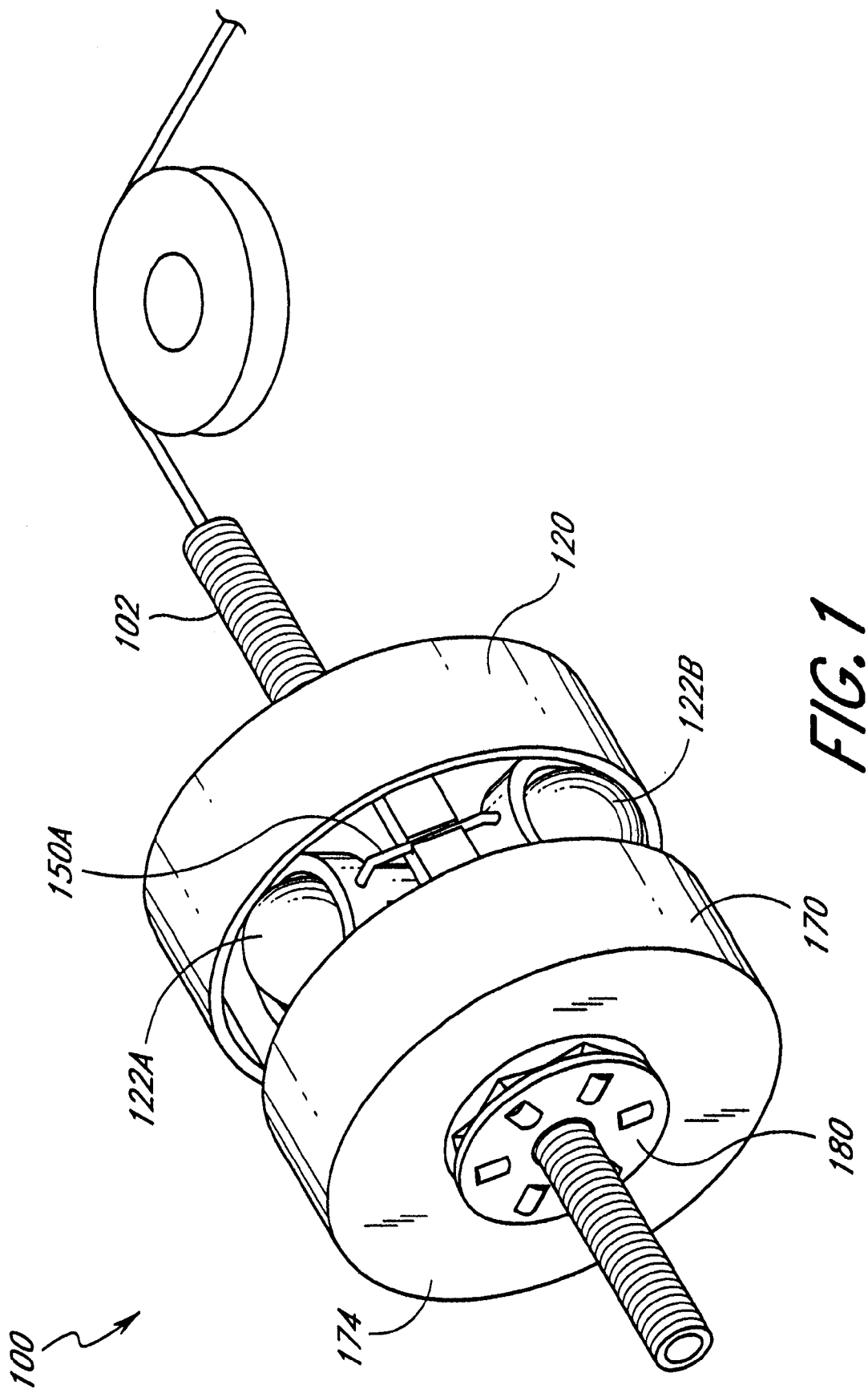
FIG. 1 is a partial perspective view of the transmission of the present invention.
Figure 2:
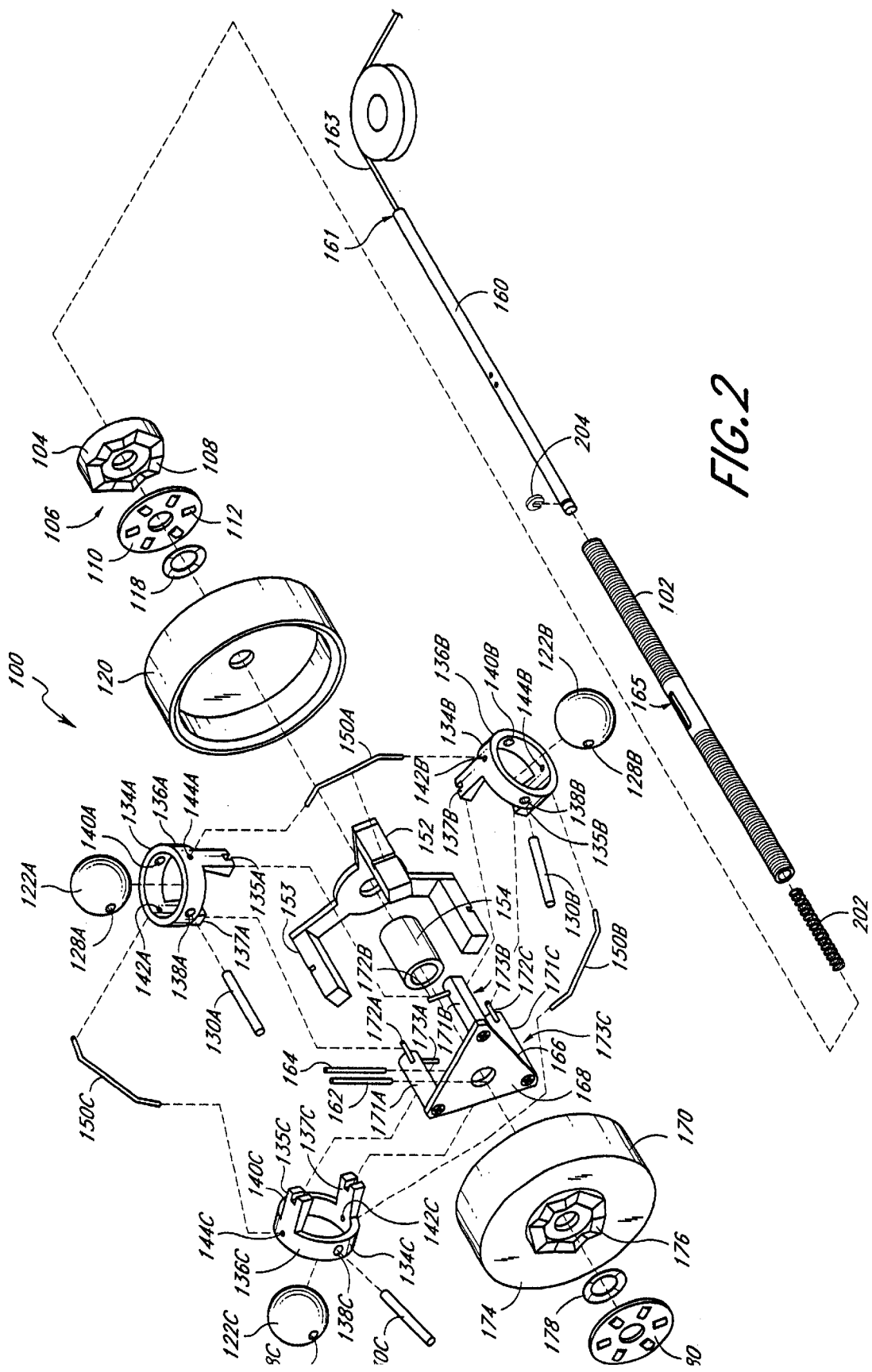
FIG. 2 is a partial exploded view of the transmission of FIG. 1.

FIGS. 1 through 4 disclose one embodiment of the present invention. FIG. 1 is a partial perspective view of a transmission 100. FIG. 2 is an exploded view of the transmission 100 of FIG. 1. FIG. 3 shows a partial cross sectional end view of the transmission 100. FIG. 4 shows a cutaway side elevational view of the transmission 100.

Referring generally to FIGS. 1 through 4, a hollow main shaft 102 is affixed to a frame of a machine (not shown). The shaft 102 may be threaded at each end to allow a fastener (not shown) to be used to secure the transmission 100 on the main shaft 102 and/or to attach the main shaft 102 to a machine. A rotatable driver 401 (FIG. 4) comprising a sprocket or a pulley is rotatably affixed to the main shaft 102, so as to provide an input torque to the transmission 100. A drive sleeve 104 is coaxially coupled to the rotatable driver 401 (FIG. 4) and rotatably disposed over the main shaft 102. A surface 106 (FIG. 2) of the drive sleeve 104 opposite the rotatable driver 401 (FIG. 4), can include a plurality of shallow grooves 108.

A first roller cage assembly 110 is coaxially coupled to the drive sleeve 106 opposite the rotatable driver 401 and also rotatably disposed over the main shaft 102. The first roller cage assembly 110 has a plurality of cylindrical rollers 112 radially arranged about a midpoint of the roller cage assembly 110. Each of the cylindrical rollers 112 are rotatably mounted on the first roller cage assembly 110 such that each of the rollers may rotate about its lengthwise axis. Preferably, a one-to-one correlation exists between each of the shallow grooves 108 and each of the cylindrical rollers 112. Optionally, the cylindrical rollers 112 may be replaced with rollers of an alternative geometric shape, such as with spherical rollers.

A tension inducer 118 (FIG. 2), such as a spring, is rotatably disposed over the main shaft 102 and frictionally coaxially coupled to the first roller cage assembly 110 opposite the drive sleeve 104. Further, a rotatable driving member 120 is rotatably affixed to the main shaft 102 and coaxially coupled to a side of the first roller cage assembly 110 opposite the drive sleeve 104. A surface 107 (FIG. 4) of the rotatable driving member 120 opposed to the drive sleeve 104 includes a plurality of shallow grooves 109 (FIG. 4). Relative rotation of the roller cage 110 with respect to the drive sleeve 104 causes the cylindrical rollers 112 to roll on the shallow grooves 108, 109 and move the shallow grooves 108, 109 toward or away from each other along the axis of the main shaft 102.

A plurality of spherical power adjusters 122A, 122B, 122C are in frictional contact with a side of the rotatable driving member 120 opposite the roller cage assembly 110. In one embodiment of the invention, the power adjusters 122A, 122B, 122C are spheres made of hardened steel; however, the power adjusters 122A, 122B, 122C may alternatively include other shapes and be manufactured from other materials. A plurality of spindles 130A, 130B, 130C (FIG. 2) respectively extend through multiple passages 128A, 128B, 128C (FIG. 2) in the power adjusters 122A, 122B, 122C. Radial bearings (not shown) may be disposed over each of the spindles 130A, 130B, 130C (FIG. 2) to facilitate the rotation of the power adjusters 122A, 122B, 122C.

A plurality of pivot supports 134A, 134B, 134C respectively hold the spindles 130A, 130B, 130C (FIG. 2). The support 134A includes two legs 135A and 137A for connection to a ratio changer 166 which is discussed in further detail below. Similarly, the support 134B includes two legs 135B and 137B, and the pivot support 134C includes two legs 135C and 137C.

The pivot supports 134A, 134B, 134C respectively include pivot rings 136A, 136B, 136C. The pivot ring 136A has four apertures 138A, 140A, 142A, 144A (FIG. 2). Similarly, the pivot support 134B has four apertures 138B, 140B, 142B, and 144B, and the pivot support 134C has four apertures 138C, 140C, 142C, and 144C (FIG. 2). The apertures 138A, 138B, 138C are respectively located opposite to the apertures 140A, 140B, 140C on the pivot rings 136A, 136B, and 136C. Together, the apertures 138A, 138B, 138C, and the apertures 140A, 140B, 140C are respectively configured to receive the spindles 130A, 130B, 130C (FIG. 2).

The apertures 142A, 142B, 142C (FIG. 2) are respectively located opposite to the apertures 144A, 144B, 144C (FIG. 2) on the pivot rings 136A, 136B, 136C. Together, the apertures 142A, 142B, 142C and the apertures 144A, 144B, 144C are configured to receive multiple immobilizers 150A, 150B, 150C (FIG. 2). In one embodiment of the invention, the immobilizers 150A, 150B, 150C are each cylindrical rigid rods, slightly angled at each end. A central portion of each of the immobilizers 150A, 150B, 150C are affixed to one of multiple legs 153 (FIG. 2) of a stationary support 152 (FIG. 2). The stationary support 152 is fixedly attached to the main shaft 102.

Figure 17:
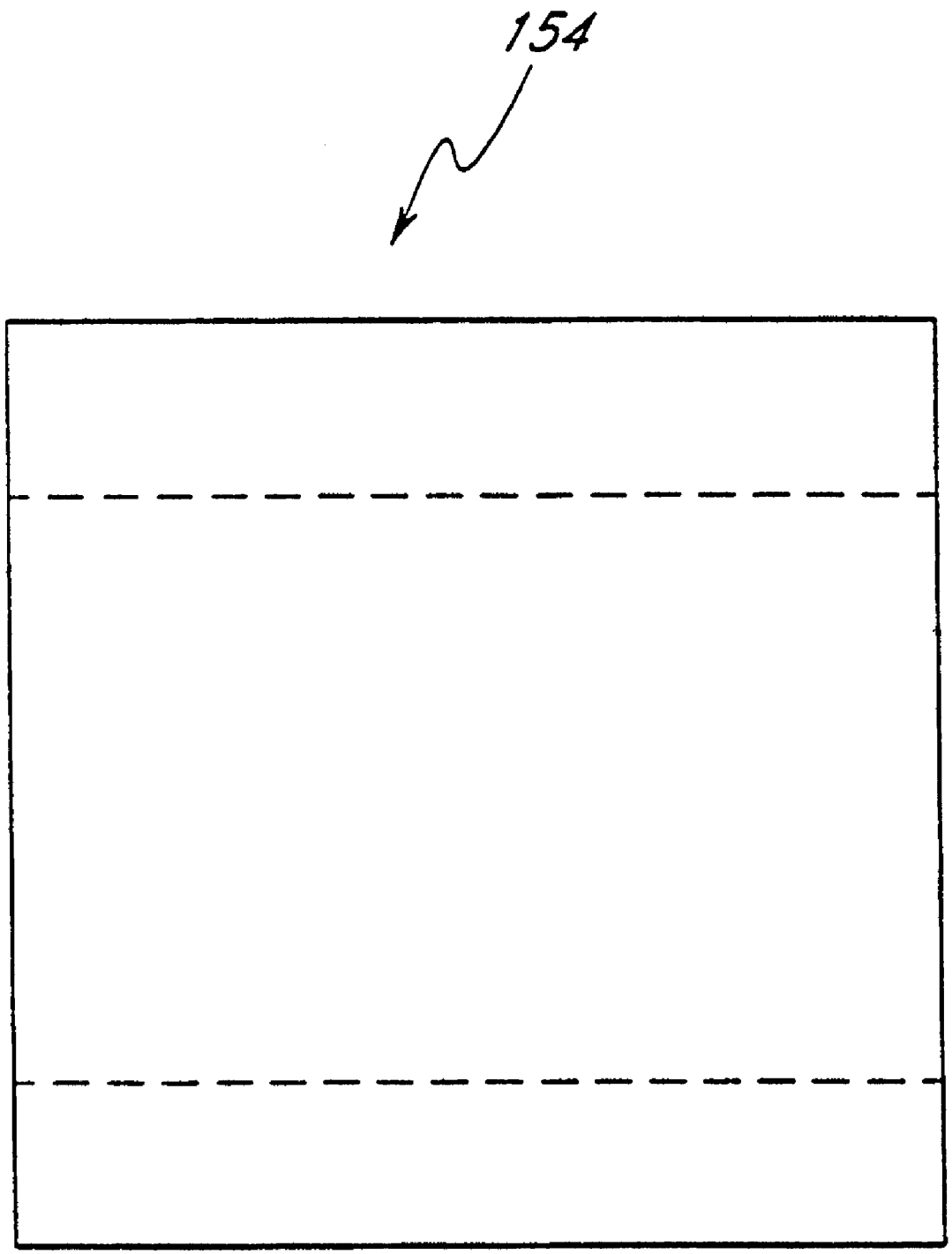
FIG. 17 is a side elevational view of an alternative embodiment of a support member.

A support member 154 is slidingly and rotatably disposed over the main shaft 102 proximate to a side of the stationary support 152 (FIG. 2) which is opposite to the rotatable driving member 120. The support member 154 is in frictional contact with each of the power adjusters 122A, 122B, 122C. In one embodiment of the invention, the support member 154 is a cylindrical ring having a substantially uniform outer circumference from an end cross-sectional view. In another embodiment of the invention, the support member 154 is a cylindrical ring having a first and second flange (not shown) which respectively extend radially outwardly from a first and second end of the support member 154 so as to prevent the power adjusters 122A, 122B, 122C from disengaging from the support member 154. In yet another embodiment of the invention, the support member 154 is a cylindrical ring having a nominally concavical outer surface (FIG. 17).

The support member 154 may contact and rotate upon the main shaft 102, or may be suspended over the main shaft 102 without substantially contacting it due to the centering pressures applied by the power adjusters 122A, 122B, 122C.

Referring in particular to FIG. 2, a shifting member 160, such as an inflexible rod, is slidingly engaged to an inner passage of the main shaft 102. Two extensions 162, 164 perpendicularly extend from the shifting member 160 through an opening 165 in the main shaft 102. A first end 161 of the shifting member 160 proximate to the drive side of the transmission 100 is connected to a linkage 163, such as a cable. The linkage 163 is connected at an end opposite to the main shaft 102 to a shifting actuator (not shown). A tension member 202, such as a spring, is connected to a second end of the shifting member 160 by a fastener 204.

Still referring in particular to FIG. 2, the extensions 162, 164 connect to the ratio changer 166. The ratio changer 166 includes a planar platform 168 and a plurality of legs 171A, 171B, 171C which perpendicularly extend from a surface of the platform 168 proximate to the support member 154. The leg 171A includes two linkage pins 172A, 173A. Similarly, the leg 171B includes two linkage pins 172B and 173B, and the leg 171C includes two linkage pins 172C and 173C. The linkage pins 172A, 172B, 172C, and the linkage pins 173A, 173B, 173C are used to couple the ratio changer 166 to each of the pivot supports 134A, 134B, and 134C.

In regard to the coupling of the support 134A and the ratio changer 166, the linkage pin 172A engages an end of the leg 137A of the support 134A opposite the pivot ring 136A, and the linkage pin 172B engages an end of the leg 135A opposite the pivot ring 136A. Further, in regard to the coupling between the pivot support 134B and the ratio changer 166, the linkage pin 173B engages an end of the leg 137B opposite the pivot ring 136B, and the linkage pin 172C engages an end of the leg 135B opposite the pivot ring 136B. Finally, in regard to the coupling between the pivot support 134C and the ratio changer 166, the linkage pin 173C engages an end of the leg 137C opposite the pivot ring 136C, and the linkage pin 173A engages an end of the leg 137B opposite the pivot ring 136C.

Although only three power adjusters 122A, 122B, 122C are disclosed, the transmission 100 of the invention may be configured with fewer (e.g., 2) or more (e.g., 4, 5, 6 or more) power adjusters. Further, the number of legs on the ratio changer 166, the number of legs on the stationary support 152, the number of immobilizers, the number of pivot supports in the transmission may all be correspondingly adjusted according to the number of power adjusters that are employed.

Referring again in general to FIGS. 1–4, a rotatable driven member 170 is rotatably engaged to the main shaft 102 proximate to the ratio changer 166 (FIG. 2). The rotatable driven member 170 is in frictional contact with each of the power adjusters 122A, 122B, 122C. A surface 174 of the rotatable driven member 170 opposite the power adjusters 122A, 122B, 122C, includes a plurality of shallow grooves 176. The rotatable driven member 170 is in frictional coaxial contact with a second tension inducer 178 (FIG. 2), such as a spring, and a second roller cage assembly 180 that is similar in design to the roller cage assembly 110. The second tension inducer 178 (FIG. 2) and the second roller cage assembly 180 are rotatably disposed over the main shaft 102. A hub driver 186 (FIG. 4) is rotatably disposed over the main shaft 102 and coaxially engaged to a side of the second roller cage assembly 180 opposite the rotatable driven member 170. The hub driver 186 (FIG. 4) may be affixed to a hub shell 302 (FIGS. 3 and 4) using any traditional gearing mechanism. In one embodiment of the invention, the hub driver 186 extends proximate to the hub shell 302 and is connected to a one way rotatable driver 300, such as a one way roller clutch. The one way rotatable driver 300 (FIGS. 3 and 4) is rotatably coupled to the hub shell 302 (FIGS. 3 and 4).

Note that the power adjusters 122A, 122B, 122C are suspended in tight three-point frictional contact with the drive member 120, the support member 154, and the driven member 170.

The hub shell 302 (FIGS. 3 and 4) has a plurality of holes 304 (FIG. 3) which provide a means for attaching the hub shell 302 to a wheel, propeller or other propulsion means. The hub shell 302 is supported and is free to rotate on the main shaft 102 by means of hub bearings 410 (FIG. 4) which fit into slots in the hub driver 186. A washer 412 (FIG. 4) is affixed to the main shaft 102 proximate to a side of the hub driver 186 opposite the second roller cage assembly 180 to facilitate the rotation of the hub bearings 410 (FIG. 4).

Figure 5:
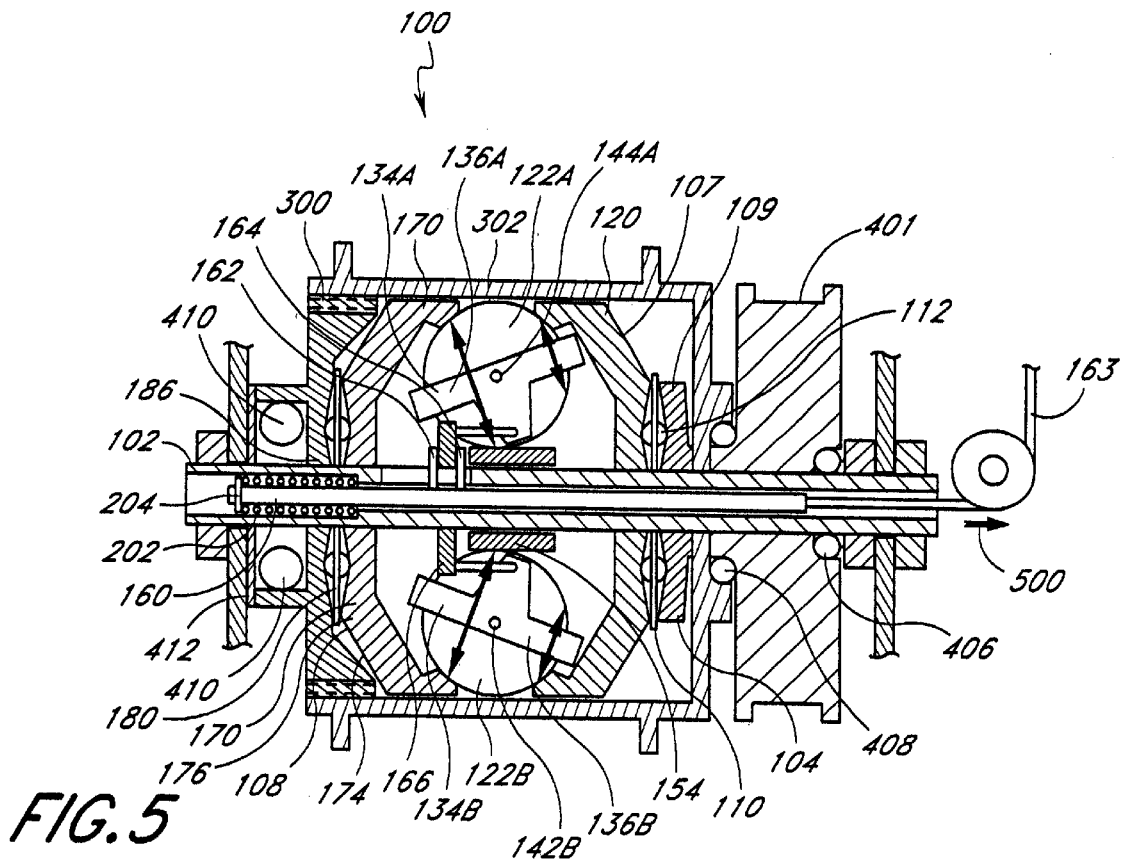
FIGS. 5 and 6 are cutaway side elevational views of the transmission of FIG. 1 illustrating the transmission of FIG. 1 shifted into different positions.
Figure 6:
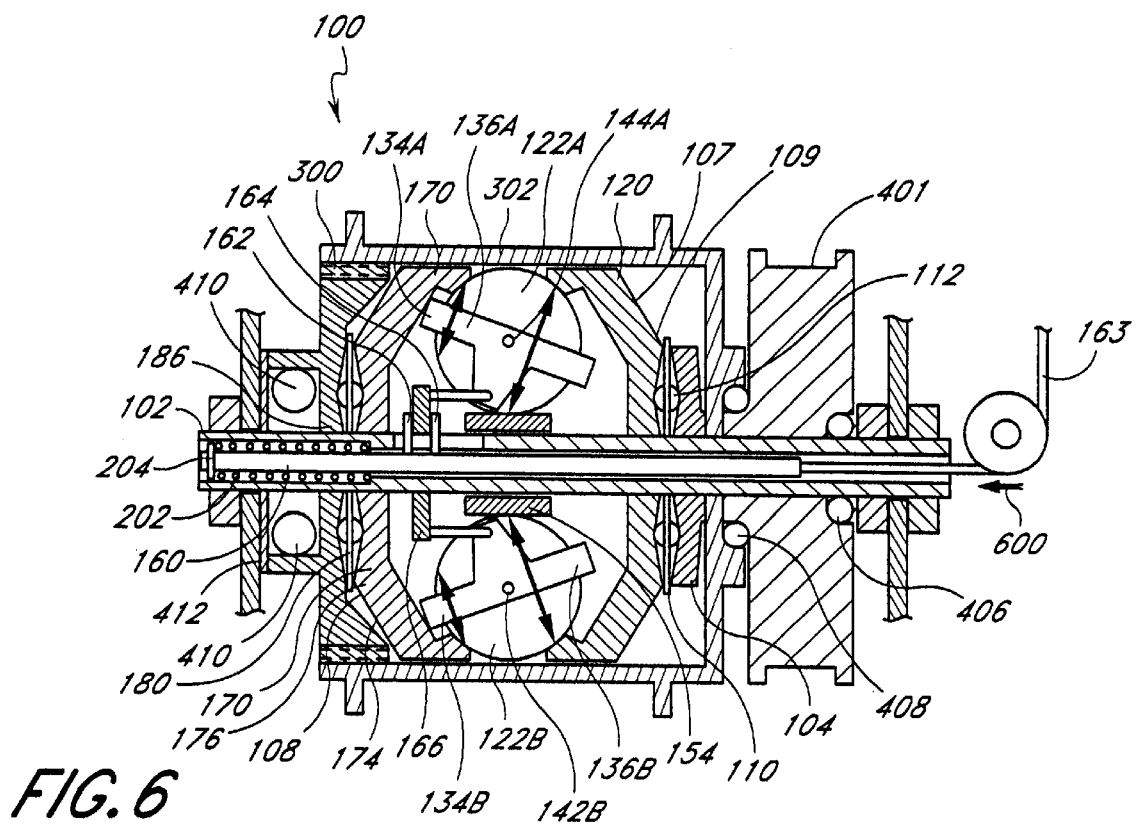

FIGS. 5 and 6 are a cutaway side elevational views of the transmission of FIG. 1 illustrating the transmission of FIG. 1 in two different shifted positions. With reference to FIGS. 5 and 6, a method of shifting the transmission 100 is disclosed below.

Upon an input force, the drive sleeve 104 begins to rotate in a clockwise direction. (It should be noted that the transmission 100 is also designed to be driven in a counter-clockwise direction.) At the beginning of the rotation of the drive sleeve 104, nominal axial pressure is supplied by the tension inducers 118, 178 (FIG. 2) to ensure that the rotatable driving member 120, the rotatable driven member 170, and the support member 154 are in tractive contact with the power adjusters 122A, 122B, 122C.

The rotation of the drive sleeve 104 in a clockwise direction engages the first roller cage assembly 110 to rotate in a similar direction. At a low torque, the rollers 112 remain centered between the shallow grooves 108, 109 of the rotatable driving member 120 and the drive sleeve 104. As additional torque is applied, the rollers 112 ride up the sloping sides of the grooves 108 and force the drive sleeve 104 and the rotatable driving member 120 farther apart. The same action occurs on the opposite end of the transmission 100 wherein the rotatable driven member 170 engages the hub driver 186 though the second roller cage assembly 180. Thus, the first roller cage assembly 110 and second roller cage assembly 180 compress the rotatable driving member 120 and the rotatable driven member 170 together against the power adjusters 122A, 122B, 122C, which increases the frictional contact of the power adjusters 122A, 122B, 122C against the support member 154, the drive member 120, and the driven member 170.

As the first rotatable driving member 120 is rotated in a clockwise direction by the roller cage assembly 110, the roller cage assembly 110 frictionally rotates the power adjusters 122A, 122B, 122C. The clockwise rotation of the power adjusters 122A, 122B, 122C causes a clockwise rotation of the rotatable driven member 170. The clockwise rotation of the rotatable driven member 170 engages the second roller cage assembly 180 to rotate in a clockwise direction. In turn, the clockwise rotation of the second roller cage assembly 180 engages the hub driver 186 (FIG. 4) to drive in a clockwise direction. The clockwise rotation of the hub driver 186 causes the one way rotatable driver 300 to rotate clockwise. The one way rotatable driver 300 then drives the hub shell 302 (FIGS. 3 and 4) to rotate in a clockwise direction.

The shifting member 160 is used to modify the axis of a rotation for the power adjusters 122A, 122B, 122C. To shift the transmission 100, the shifting actuator (not shown) slides the shifting member 160 in a first direction 500 (FIG. 5). A release in tension of the linkage 163 by the shifting actuator (not shown) causes the shifting member 160 to slide in a second and opposite direction 600 (FIG. 6) by the tension member 202. The particular construction of the present transmission 100 provides for much easier shifting than prior art traction roller designs.

When the shifting member 160 is moved in either direction by a user, the extensions 162, 164 engage the ratio changer 166 to axially move across the main shaft 102. Referring to FIG. 5, when the shifting member 160 is moved, the ratio changer 166 pivots the supports 134A, 134B, 134C. The pivoting of the supports 134A, 134B, 134C tilts the ball spindles 130A, 130B, 130C and changes the axis of rotation of each of the power adjusters 122A, 122B, and 122C. When the shifting member 160 is moved in the direction 500, the axis of rotation of each of the power adjusters 122A, 122B, 122C is modified such that the rotatable driving member 120 contacts a surface of power adjuster, 120A, 120B, 120C closer to the axis of rotation of the power adjusters 120A, 120B, 120C. Further, the rotatable driven member 170 contacts the power adjuster at a point on a surface of the each of the power adjusters 120A, 120B, 120C further away from the axis of rotation of the power adjusters 120A, 120B, 120C. The adjustment of the axis of rotation for the power adjusters 122A, 122B, 122C increases an output angular velocity for the transmission 100 because for every revolution of the rotatable driving member 120, the rotatable driven member 170 rotates more than once.

Referring to FIG. 6, the transmission 100 of the invention is shown in a position which causes a decrease in the output angular velocity for the transmission 100. As the shifting member 160 is directed in the direction 600, opposite the first direction 500, the axis of rotation of each of the power adjusters 122A, 122B, 122C is modified such that the rotatable driven member 170 contacts a surface of each of the power adjusters 122A, 122B, 122C closer to the axis of rotation of each of the power adjusters 122A, 122B, 122C. Further, the rotatable driving member 120 contacts each of the power adjusters 122A, 122B, 122C at a point on a surface of each of the power adjusters 122A, 122B, 122C further away from the axis of rotation of each of the power adjusters 122A, 122B, 122C. The adjustment of the axis of rotation for the power adjusters 122A, 122B, 122C decreases an output angular velocity for the transmission 100 because for every revolution of the rotatable driving member 120, the rotatable driven member 170 rotates less than once.

FIGS. 7 and 8 illustrate an automatic transmission 700 of the present invention. For purposes of simplicity of description, only the differences between the transmission 100 of FIGS. 1–6 and the automatic transmission 700 are described. FIG. 7 is a partial end elevational view of the transmission 700, and FIG. 8 is partial side elevational view of the transmission 700.

A plurality of tension members 702A, 702B, 702C, which may each be a spring, interconnect each of the pivot rings 136A, 136B, 136C. The tension member 702A is connected at a first end to the pivot ring 136A and at a second end opposite the first end to the pivot ring 136B. Further, the tension member 702B is connected at a first end to the pivot ring 136B proximate to the aperture 138B and at a second end opposite the first end to the pivot ring 136C proximate to the aperture 138C. Further, the tension member 702C is connected at a first end to the pivot ring 136C proximate to the aperture 138C and at a second end opposite the first end to the pivot ring 136A proximate to the aperture 138A.

The transmission 700 also includes flexible extension members 708A, 708B, 708C respectively connected at a first end to the pivot rings 136A, 136B, 136C. The transmission 700 also includes a first annular bearing 806 and a second annular bearing 816 to assist in the shifting of the transmission 700. The first annular bearing 806 is slidingly attached to the hub shell 302 such that first the annular bearing 806 can further be directed toward the rotatable driving member 120 or the rotatable driven member 170. The second annular bearing 816 also is configured to be slid toward either the rotatable driving member 120 or the rotatable driven member 170; however, the second annular bearing 816 is not rotatable about the main shaft 102, unlike the first annular bearing 806. The first annular bearing 806 and the second annular bearing 816 supports multiple bearing balls 808. A second end of each the extension members 708A, 708B, 708C connects to the second annular bearing 816 (FIG. 8).

Multiple extension members 718A, 718B, 718C respectively connect the first annular bearing 806 to multiple weights 720A, 720B, 720C. Optionally, a plurality of pulleys 822 may be used to route the extension members 718A, 718B, 718C from the second annular bearing 816 to the weights 720A, 720B, 720C, and route the extension members 708A, 708B, 708C to the first annular bearing 806.

Still referring to FIGS. 7 and 8, a method of operation for the transmission 700 is disclosed. Similar to the embodiment of the invention disclosed in FIG. 1, a clockwise input torque causes clockwise rotation of the drive sleeve 104, the first roller cage assembly 110, and the rotatable driving member 120. The rotatable driving member 120 engages the power adjusters 122A, 122B, 122C to rotate, and thereby drives the rotatable driven member 170. The rotation of the rotatable driven member 170 drives the second roller cage assembly 180 and produces an output torque.

However, to be distinguished from the transmission 100 illustrated in FIG. 1, the ratio of rotation between the rotatable driving member 120 and the rotatable driven member 170 is adjusted automatically by a centrifugal outward movement of the weights 720A, 720B, 720C. As the weights 720A, 720B, 720C extend outwardly, the extensions 718A, 718B, 718C pull the first annular bearing 806 toward the rotatable driving member 120. The movement of the first annular bearing 806 toward the rotatable driving member 120 similarly causes the movement of the bearings 808 and the second annular bearing 816 toward the rotatable driving member 120.

The movement of the first annular bearing 806 toward the rotatable driving member 120 causes the extension members 708A, 708B, 708C to respectively pivot the pivot rings 306A, 306B, 306C and adjust the axis of rotation of each of the power adjusters 122A, 122B, 122C. After the adjustment, the rotatable driven member 170 contacts a surface of power adjusters 120A, 120B, 120C closer to the axis of rotation of each of the power adjuster 122A, 122B, 122C. Conversely, the rotatable driving member 120 contacts the power adjusters 122A, 122B, 122C at a point on a surface of the each of the power adjusters 122A, 122B, 122C further away from the axis of rotation of the power adjusters 122A, 122B, 122C. The adjustment of the axis of rotation for the power adjusters 122A, 122B, 122C decreases an output angular velocity for the transmission 100 because for every revolution of the rotatable driving member 120, the rotatable driven member 170 rotates less than once. When the hub shell 302 rotates more slowly, the compression members 702A, 702B, 702C adjust the axis of rotation of the power adjusters 122A, 122B, 122C to provide to a lower output angular velocity in comparison to the input angular velocity.

Figure 10:
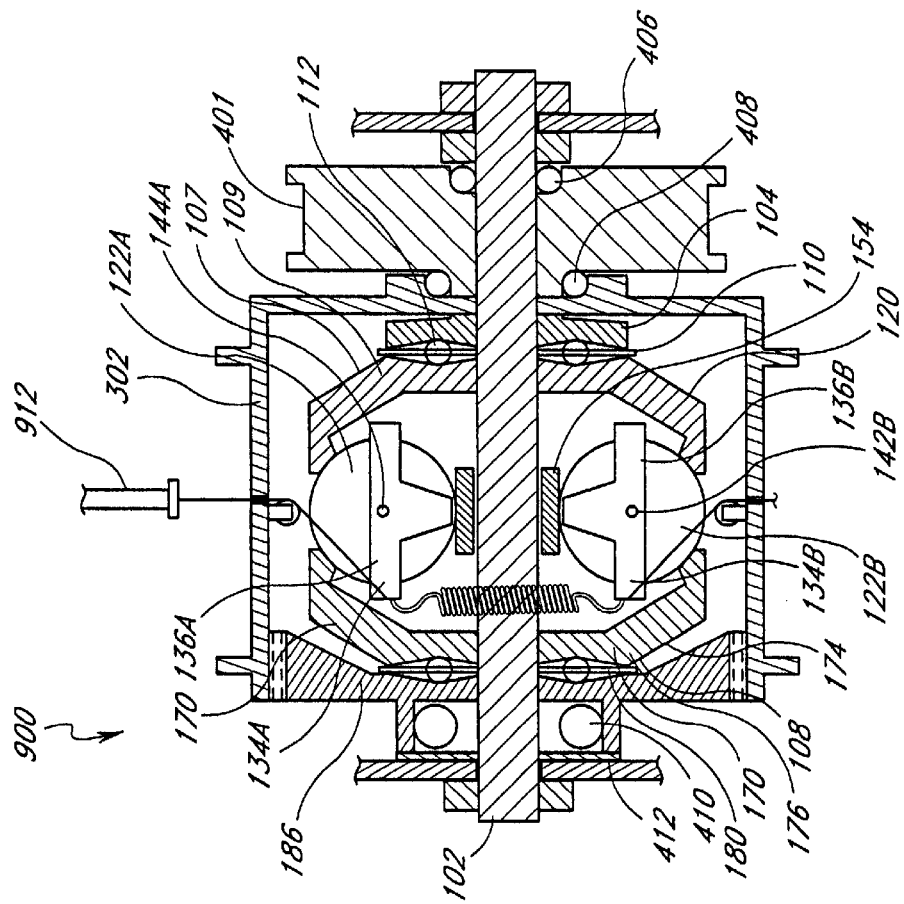
FIG. 10 is a cutaway side elevational view of the transmission of FIG. 9.
Figure 9:
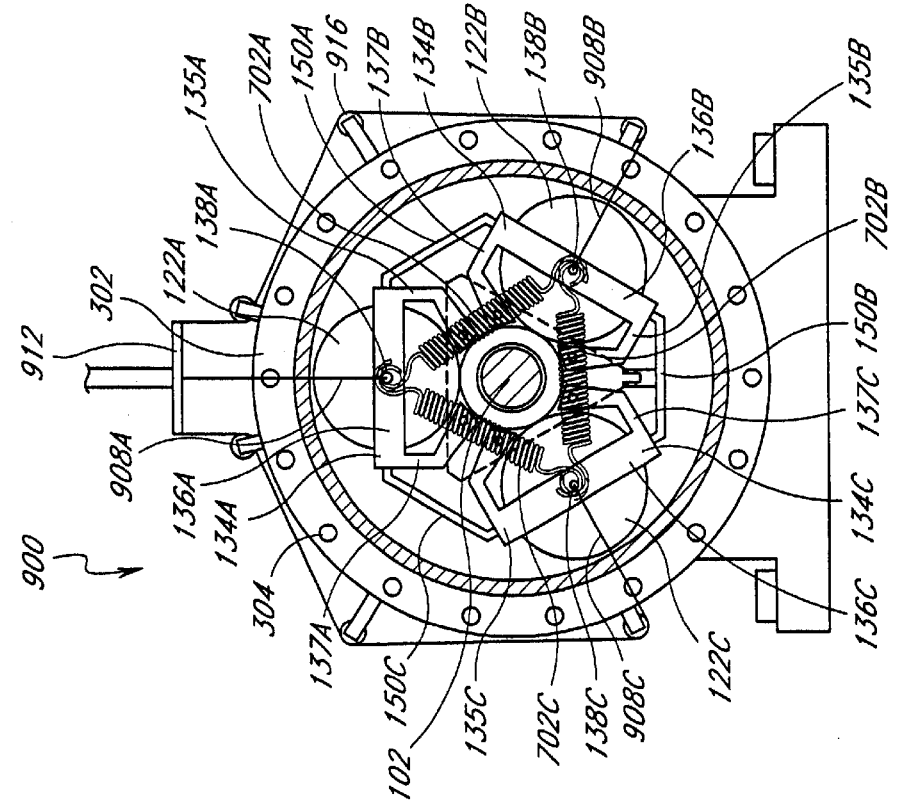
FIG. 9 is an end cutaway view of an alternative embodiment of the transmission of the invention wherein the transmission includes a stationary hub shell.

FIGS. 9 and 10 illustrate an alternative embodiment of the invention. For purposes of simplicity of description, only the differences between the transmission 100 of FIGS. 1 and a transmission 900 of FIGS. 9 and 10 are described. FIG. 9 is a partial end elevational view of the transmission 900, and FIG. 10 is partial side elevational view of the transmission 900.

The transmission 900 includes flexible extension members 908A, 908B, 908C respectively connected at a first end to the pivot rings 136A, 136B, 136C. A second end of the extension members 908A, 908B, 908C connects to a synchronization member 912. Further each of the extension members 908A, 908B, 908C are slidingly engaged to a plurality of pulleys 916 (FIG. 9) which are affixed to the hub shell 302. It is noted that the number and location of the each of the pulleys 916 (FIG. 9) may be varied. For example, a different pulley configuration may be used to route the extension members 908A, 908B, 908C depending on the selected frame of the machine or vehicle that employs the transmission 900. Additionally, the pulleys 916 and extension members 908A, 908B, 908C may be located inside the hub shell 302.

The hub shell 302 of the transmission 900 is non-rotational. Further, the hub shell 302 includes a plurality of apertures (not shown) which are used to guide the extension members 908A, 908B, 908C to the synchronization member 912.

To be noted, according to the embodiment of the invention illustrated in FIGS. 9 and 10, the shifting assembly of the transmission 100 of FIG. 2 may be eliminated, including the main shaft 102 (FIG. 2), the tension member 202 (FIG. 2), the extensions 162, 164 (FIG. 2) and the shifting actuator (not shown).

Still referring to FIGS. 9 and 10, a method of operation for the transmission 900 is disclosed. Similar to the embodiment of the invention disclosed in FIG. 1, an input torque causes a clockwise rotation of the drive sleeve 104, the first roller cage assembly 110, and the rotatable driving member 120. The rotatable driving member 120 engages the power adjusters 122A, 122B, 122 to rotate, and thereby drive the rotatable driven member 170. The rotation of the rotatable driven member 170 drives the second roller cage assembly 180 and produces an output torque.

In the transmission 900, the ratio of rotation between the rotatable driving member 120 and the rotatable driven member 170 is adjusted by the manipulation of the synchronization member 912. As the synchronization member 912 is outwardly directed from the hub shell 302, the extension members 908A, 908B, 908C respectively pivot the pivot rings 136A, 136B, 136C such that the axis of rotation of each of the power adjusters 122A, 122B, and 122C is similarly pivoted. The axis of rotation of each of the power adjusters 122A, 122B, 122C is modified such that the rotatable driving member 120 contacts a surface of power adjusters 122A, 122B, 122C further away from the axis of rotation of each of the power adjusters 122A, 122B, 122C. Conversely, the rotatable driven member 170 contacts the power adjusters 122A, 122B, 122C at a point on a surface of the each of the power adjusters 122A, 122B, 122C closer to the axis of rotation of each of the power adjusters 122A, 122B, 122C. The adjustment of the axis of rotation for the power adjusters 122A, 122B, 122C decreases an output angular velocity for the transmission 100 because for every revolution of the rotatable driving member 120, the rotatable driven member 170 rotates less than once.

When the synchronization member 912 is directed toward the hub shell 302, the tension members 702A, 702B, 702C compress. This compression causes an end of the pivot rings 136A, 136B, 136C proximate to the rotatable driven member 170 to pivot toward the main shaft 102. The pivoting of the pivot rings 136A, 136B, 136C causes the axis of rotation of each of the power adjusters 122A, 122B, 122C to be modified such that the rotatable driven member 170 rotates slower than the rotatable driving member 120.

Figures 11, 12:
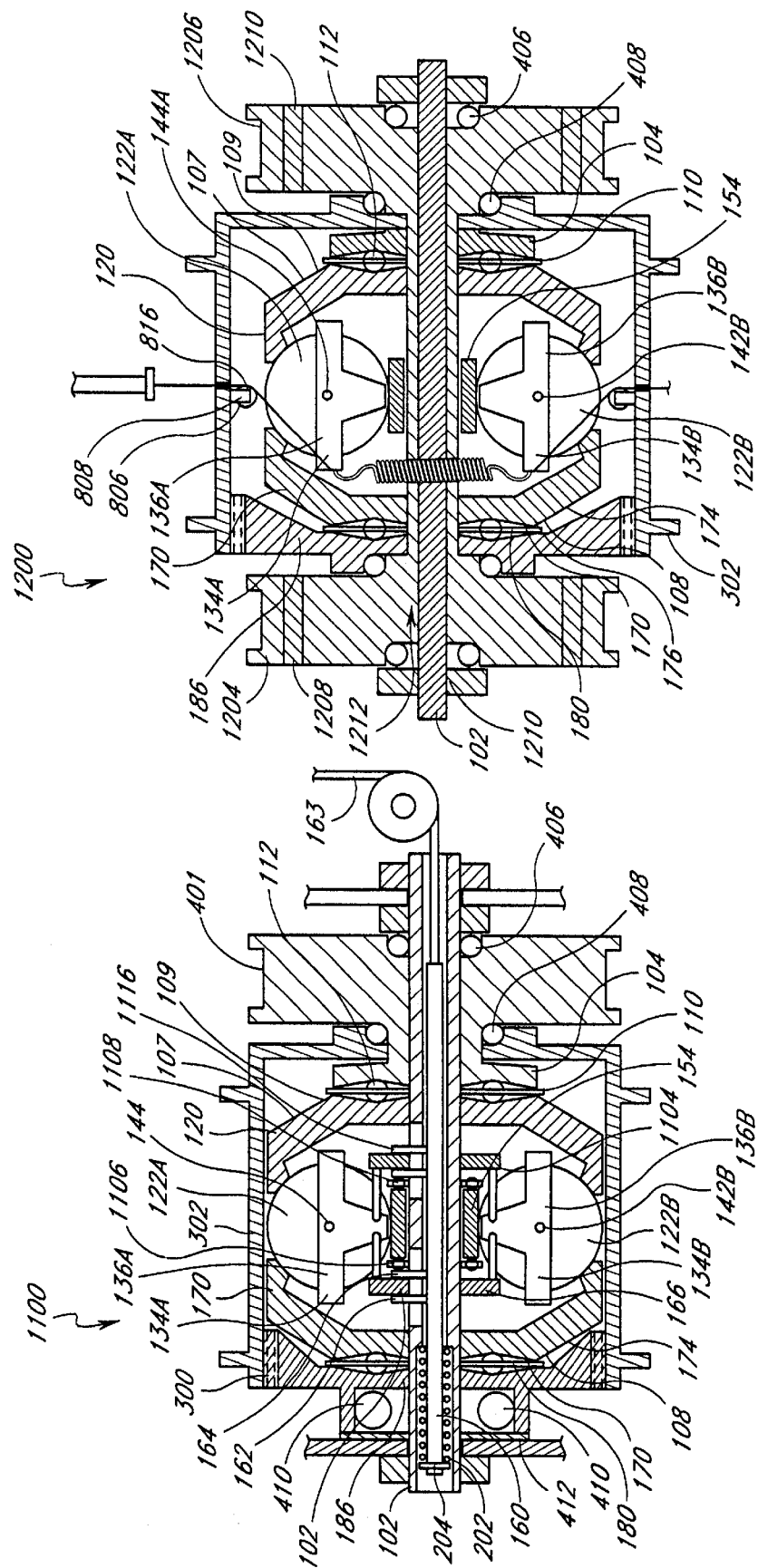
FIG. 11 is a cutaway side elevational view of an alternative embodiment of the transmission of FIG. 1 wherein the transmission has two thrust bearings.
FIG. 12 is a cutaway side elevational view of an alternative embodiment of the invention wherein a first and second one way rotatable driver provides an input torque to the transmission.

FIG. 11 illustrates another alternative embodiment of the invention including a transmission 1100 having a first thrust bearing 1106 and a second thrust bearing 1108. The first thrust bearing 1106 is rotatably disposed over the main shaft 102 and is positioned between the support member 154 and the extensions 162, 164. The second thrust bearing 1108 is disposed over the main shaft 102 on a side of the support member 154 opposite the first thrust bearing 1106. The transmission 1100 may optionally also include a second ratio changer, such as ratio changer 1110, which is disposed over the main shaft 102 and is axially slidable.

When the ratio changers 166, 1110 slide axially to cause a shift in the transmission 1100, the ratio changers 166, 1110 also slide the thrust bearings 1106, 1108. The sliding of the thrust bearings 1106, 1108 forces the support member 154 to slide in unison with the ratio changers 166, 1110. A small amount of play is provided between the support member 154 and the thrust bearings 1106, 1008 so that the thrust bearings 1106, 1108 do not contact the support member 154 except when the transmission 1100 is in the process of shifting.

FIG. 12 illustrates an alternative embodiment of the invention. FIG. 12 illustrates a transmission 1200 that operates similarly to the embodiment of the invention disclosed in FIG. 10; however, the transmission 1200 of FIG. 12 includes two rotatable drivers 1204, 1206 and a rotatable driving shaft 1212. The rotatable driving shaft 1212 is fixedly attached to the drive sleeve 104.

Still referring to FIG. 12, the first rotatable driver 1204 includes a one way clutch 1208 that is configured to rotate the rotatable driving shaft 1212 upon the rotation of the rotatable driver in a first direction. The second rotatable driver 1206 includes a one way clutch 1210. The second rotatable driver 1206 is configured to engage the drive sleeve 104 upon the rotation of the second rotatable driver 1206 in a second direction, which is opposite to the activation direction of the first rotatable driver 1204. The second rotatable driver 1206 is fixedly attached to the drive sleeve 104.

FIG. 13 schematically illustrates another alternative embodiment of the invention having a transmission 1300 that is configured to shift automatically. Three pulleys 1306, 1308, 1310 are respectively connected to the pivot rings 136A, 136B, and 136C. A cable 1312 is guided around the pulley 1306 and connects at a first end to the main shaft 102 and connects at a second end to an annular ring (not shown), similar to the annular ring 816 of FIG. 8. Similarly, a cable 1314 is guided around the pulley 1308 and connects to the main shaft 102 at a first end and connects at a second end to the annular ring (not shown). Lastly, a cable 1316 is guided around the pulley 1310 and connects at a first end to the main shaft 102 and connects at a second end to the annular ring (not shown).

FIG. 14 schematically illustrates the transmission 1300 of FIG. 13 from a front end. A plurality of tension members 1404, 1406, 1408 interconnect each of the pivot rings 136A, 136B, and 136C. The tension member 1404 connects at a first end to the pivot ring 136A and connects at a second end opposite the first end to the pivot ring 136B. The tension member 1406 connects at a first end to the pivot ring 136B and connects at a second end opposite the first end at the pivot ring 136C. The tension member 1408 connects at a first end to the pivot ring 136A and connects at a second end opposite the first end at the pivot ring 136C.

FIG. 15 schematically illustrates a housing 1500 for the transmission 1300 of FIGS. 13 and 14. The housing 1500 includes three hollow guide tubes 1504, 1506, and 1508. Each of the hollow guide tubes 1504, 1506, 1508 connect at a first end to a hub shell 1512 that holds the transmission 1300 and at a second end opposite the first end to a transmission wheel 1514. Three tension members 1516, 1518, 1520 are respectively disposed within the guide tubes 1504, 1506, 1508 and are connected at a first end to the transmission wheel 1514. A second end of the tension members 1516, 1518, 1520 opposite the transmission wheel 1514 are respectively connected with spherical weights 1526, 1528, 1530. In alternative embodiments of the invention, the weights 1526, 1528, 1530 may be adapted to other geometric shapes.

Multiple linkage members 1532, 1534, 1536, respectively extend from the weights 1526, 1528, 1530 to an annular member (not shown), such as the annular member 806 of FIG. 8.

Turning to the method of operation of the housing 1500 of FIG. 15, the rotation of the hub shell 1512 causes the rotation of the hollow guide tubes 1504, 1506, 1508. As the guide tubes 1504, 1506, 1058 rotate, the weights 1526, 1528, 1530 extend outwardly toward the transmission wheel 1514. The outward movement of the weights 1526, 1528, 1530 causes a shifting of the axis of rotation of the power adjusters 122A, 122B, 122C of FIGS. 13 and 14.

FIG. 16 is another alternative embodiment of the invention. FIG. 16 is a schematic illustration of a manual version of the transmission 1300 shown in FIGS. 13 and 14. For purposes of simplicity of description, only the differences between the transmission 1600 of FIG. 16 and the transmission 1300 of FIGS. 13 and 14 are described. The transmission 1600 includes a flexible cable 1602 that connects at a first end to a shifting actuator (not shown). The cable 1602 extends from the shifting actuator (not shown), through the central passageway of the main shaft 102 and then extends through an aperture (not shown) on the main shaft 102. From the aperture (not shown) the cable 1602 extends around the pulley 1308. From the pulley 1308, the cable is guided around the pulley 1306. From the pulley 1306, the cable extends to the pulley 1308. Finally, from the pulley 1308, the cable 1602 connects to the main shaft 102.

Still referring to FIG. 16, as the cable 1602 is directed toward the shifting actuator (not shown), the cable 1602 pulls on the pulleys 1304, 1306, 1308 thereby causing a shift in the axis of rotation of each of the power adjusters 122A, 122B, 122C. Conversely, when the shifting actuator (not shown) releases the cable 1602, the tension members 1404, 1406, 1408 cause each of the axis of rotation of the power adjusters 122A, 122B, 122C to shift in a second and opposite direction.

The present invention provides a novel transmission which provides a continuously variable input/output angular velocity ratio offering up to a 900% range of input/output angular velocity. Further, the transmission can be actuated either manually or automatically.

Further, the transmission of the invention provides a simple design which requires a minimal number of parts to implement, and is therefore simple to manufacture, compact, light and produces very little friction. The transmission eliminates duplicate, overlapping, or unusable gears which are found in geared transmissions. The transmission eliminates the need for clutches which are traditionally used for changing gears. Lastly, the transmission can save energy or gasoline by providing an ideal input to output angular speed ratio.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An automatic shifting transmission comprising:
   a rotatable driving member;
   a plurality of spherical power adjusters, each spherical power adjuster having a central bore;
   a plurality of spindles, one of the spindles inserted through one of the bores of the spherical power adjusters;
   a substantially cylindrical rotatable support member that is in frictional contact with each of the spherical power adjusters;
   at least one outwardly extendable weight operably connected to at least one of the spindles; and
   at least one flexible tension member operably connecting the at least one weight to at least one of the spindles.

2. The transmission of claim 1, wherein the outwardly extendable weight moves radially in response to variations in a centrifugal force that is applied to the weight, and wherein an increase in the centrifugal force causes the transmission to shift to a higher speed.

3. The transmission of claim 1, further comprising an annular bearing, the annular bearing moving in response to radial movement of the at least one weight and thereby causing a shift in the transmission.

4. The transmission of claim 3, further comprising at least two flexible tension members, at least one first flexible tension member connecting the at least one outwardly extendable weight to the annular bearing, the at least one second flexible tension member connecting the annular bearing to at least one spindle.

5. The transmission of claim 4, further comprising a tension member, the tension member biasing the shifting of the transmission in a first direction, the at least one outwardly extendable weight biasing the shifting of the transmission in a second direction.

6. The transmission of claim 5, further comprising a rotatable wheel and a hub shell, the wheel having at least one hollow spoke, wherein the hub shell is fixedly attached to the wheel and wherein at least one of the extendible weights is positioned within the hollow spoke.

7. The transmission of claim 6, further comprising at least one tension member for each outwardly extendable weight, the at least one tension member attached at a first end to the at least one outwardly extendable weight and operably attached to the rotatable wheel at a second end, the at least one tension member outwardly biasing the extendable weight.

8. The transmission of claim 4, further comprising a plurality of flexible tension member guides, at least one flexible tension member guide directing the path of the at least one first flexible tension member, at least one flexible tension member guide directing the path of the at least one second flexible tension member.

9. The transmission of claim 8, further comprising additional flexible tension member guides, at least one flexible tension member guide operably attached to each of the spindles.

10. The transmission of claim 1, further comprising a rotatable annular bearing, the annual bearing comprising;

ball or roller bearings;

a first race for the ball or roller bearings; and a second race for the ball or roller bearings.

11. The transmission of claim 10, wherein at least one flexible tension member connects the at least one outwardly extendable weight to the first race, and at least one flexible tension member operably connects the second race to at least one spindle.

12. The transmission of claim 11, wherein the rotatable annular bearing moves axially in response to the radial movement of at least one outwardly extendable weight.

13. The transmission of claim 12, wherein the rotatable annular bearing surrounds the plurality of spherical power adjusters and has an inside diameter that is greater than the circumference enclosing the plurality of power adjusters.

* * * * *